United States Patent [19]

Ishikawa et al.

[11] Patent Number: 5,969,500
[45] Date of Patent: Oct. 19, 1999

[54] CONTROL SYSTEM AND METHOD FOR MOTORS

[75] Inventors: Masami Ishikawa; Shinichi Otake; Ken Iwatsuki, all of Anjo, Japan

[73] Assignee: Aisin Aw Co., Ltd., Japan

[21] Appl. No.: 09/110,656

[22] Filed: Jul. 7, 1998

[30]  Foreign Application Priority Data

Jul. 7, 1997 [JP] Japan .................................. 9-181483

[51] Int. Cl.⁶ ....................................................... H02P 5/28
[52] U.S. Cl. ........................ 318/807; 318/800; 318/803; 318/806; 318/722; 318/808
[58] Field of Search .................................... 318/807, 800, 318/803, 806, 722, 808

[56]  References Cited

U.S. PATENT DOCUMENTS 5,585,708  12/1996  Richardson et al. .................... 318/800
5,598,081   1/1997  Okamura et al. ....................... 318/801
5,629,597   5/1997  Imanaka ................................. 318/805

Primary Examiner—Karen Masih
Attorney, Agent, or Firm—Lorusso & Loud

[57]  ABSTRACT

In a motor control system and method controlled by a d-axis current command value $i_{ds}$ and a q-axis current command value $i_{qs}$, a d-axis voltage command value $V_d^*$ and a q-axis voltage command value $v_q^*$ are computed on the basis of d-axis current deviation $\Delta i_d$ of d-axis current value $i_d$ from the d-axis current command value $i_{ds}$ and q-axis current deviation $\Delta i_q$ of q-axis current value $i_q$ from the q-axis current command value $i_{qs}$ and on the basis of q-axis inductance value $L_q$ and d-axis inductance value $L_d$ wherein the inductance values $L_q$ and $L_d$ are tuned or adjusted so that the d-axis current deviation $\Delta i_d$ and q-axis current deviation $\Delta i_q$ approach zero.

8 Claims, 3 Drawing Sheets

5,969,500

CONTROL SYSTEM AND METHOD FOR MOTORS

BACKGROUND OF THE INVENTION

1. Field of the Invention

The present invention relates to systems and methods for controlling motors.

2. Related Art

In the prior art, an electric vehicle employs a motor such as a brushless motor including a permanent magnet rotor and a stator having coils to which U, V and W phases of electric current are fed to drive the motor.

A motor control circuit or unit receives a current command value from a vehicle control circuit which controls the electric vehicle. The motor control circuit generates pulse width modulated signals forming the U, V and W individual phases in accordance with the current command value. The pulse width modulated signals are output to a drive circuit.

This drive circuit generates transistor drive signals corresponding to the pulse width modulated signals and outputs the transistor drive signals to an inverter bridge. The inverter bridge has six transistors which are turned ON only when the corresponding transistor drive signals are ON to generate and feed the currents to individual phases of the stator coils. Thus the electric vehicle is run by activating the motor drive unit to drive the motor.

When the values of currents of two of the three phases are determined, the value of the current of the third phase can be computed. In order to control the currents of the individual phases, only the currents of the U and V phases, for example, need be detected by current sensors. Feedback control is performed on a d-q axis model in which the d-axis is taken in a direction of a magnetic pole pair of the rotor and the q-axis is taken in a direction perpendicular to the d-axis.

In the motor control circuit, the sensed currents of the U and V phases are converted into a d-axis current and a q-axis current by a three-phase to two-phase conversion. A deviation of the d-axis current from a d-axis current command value is computed so that a d-axis voltage command value is generated on the basis of the d-axis current deviation. Similarly, a deviation of the q-axis current from a q-axis current command value is computed so that a q-axis voltage command value is generated on the basis of the q-axis current deviation. These d-axis and q-axis voltage command values are converted into U, V and W phase voltage command values by two-phase to three-phase conversion. The pulse width modulation signals of the individual phases are generated from the corresponding voltage command values.

In order to compute the d-axis and q-axis voltage command values using the respective d-axis and q-axis current deviations, corresponding inductances of the motor are employed so as to prevent interference between the d-axis and q-axis voltage command values. These inductances are estimated from the transient changes in the corresponding d-axis and q-axis currents.

However the prior art drive unit estimating the inductances from the transient changes in the d-axis and q-axis currents required complicated estimating computations enlarging the scale and cost of the motor control circuit. Additionally to avoid instability in the currents of the individual phases, relatively long time constants for measuring transient changes are required and such long time constants reduce the quickness of response to changing conditions.

SUMMARY OF THE INVENTION

An object of the invention is to provide an improved system and method for controlling a motor and which has a lower cost and improved response time to overcome deficiencies of the prior art.

According to the invention, there is provided a motor control system including current sensors for detecting currents of individual stator phases; a magnetic pole detector for detecting a position of a rotor magnetic pole; a first converter for converting the detected currents of the individual phases into a d-axis current and a q-axis current on the basis of the detected position of the magnetic pole; voltage command value computing means for computing a d-axis voltage command value and a q-axis voltage command value on the basis of a d-axis current deviation and a q-axis current deviation of the d-axis current and the q-axis current, respectively; inductance tuning means for tuning a d-axis inductance and a q-axis inductance so that the d-axis current deviation and the q-axis current deviation may be reduced to zero; a second converter for converting the d-axis voltage command value and the q-axis voltage command value into the voltage command values of the individual phases on the basis of the position of the magnetic pole; and pulse width modulation signal generating means for generating pulse width modulation signals of the individual phases on the basis of the voltage command values of the individual phases.

In another motor control system of the invention, the inductance tuning means interrupts identifications of the d-axis inductance and the q-axis inductance, when at least one of the RPM, the d-axis current and the q-axis current becomes lower than a set value, and tunes the d-axis inductance and the q-axis inductance on the basis of preset values for an extremely low speed as the d-axis inductance and the q-axis inductance.

According to a further aspect of the invention, there is provided a motor control method including detecting the currents of individual stator phases and the position of a rotor magnetic pole; converting the currents of the individual stator phases into a d-axis current and a q-axis current on the basis of the detected position of the magnetic pole; computing a d-axis voltage command value and a q-axis voltage command value on the basis of d-axis current deviation and q-axis current deviation of the d-axis current and the q-axis current from a d-axis current command value and a q-axis current command value, respectively; inductance tuning a d-axis inductance and a q-axis inductance so that the d-axis current deviation and the q-axis current deviation may be reduced toward zero; converting the d-axis voltage command value and the q-axis voltage command value into the voltage command values of the individual phases on the basis of the position of the rotor magnetic pole; and generating pulse width modulation signals of the individual phases on the basis of the voltage command values of the individual phases.

In another motor control method of the invention, the inductance tuning interrupts identifications of the d-axis inductance and the q-axis inductance, when at least one of the RPM, the d-axis current and the q-axis current becomes lower than a set value, and tunes the d-axis inductance and the q-axis inductance on the basis of preset values for an extremely low speed as the d-axis inductance and the q-axis inductance.

DESCRIPTION OF THE PREFERRED EMBODIMENT

Figure 2:
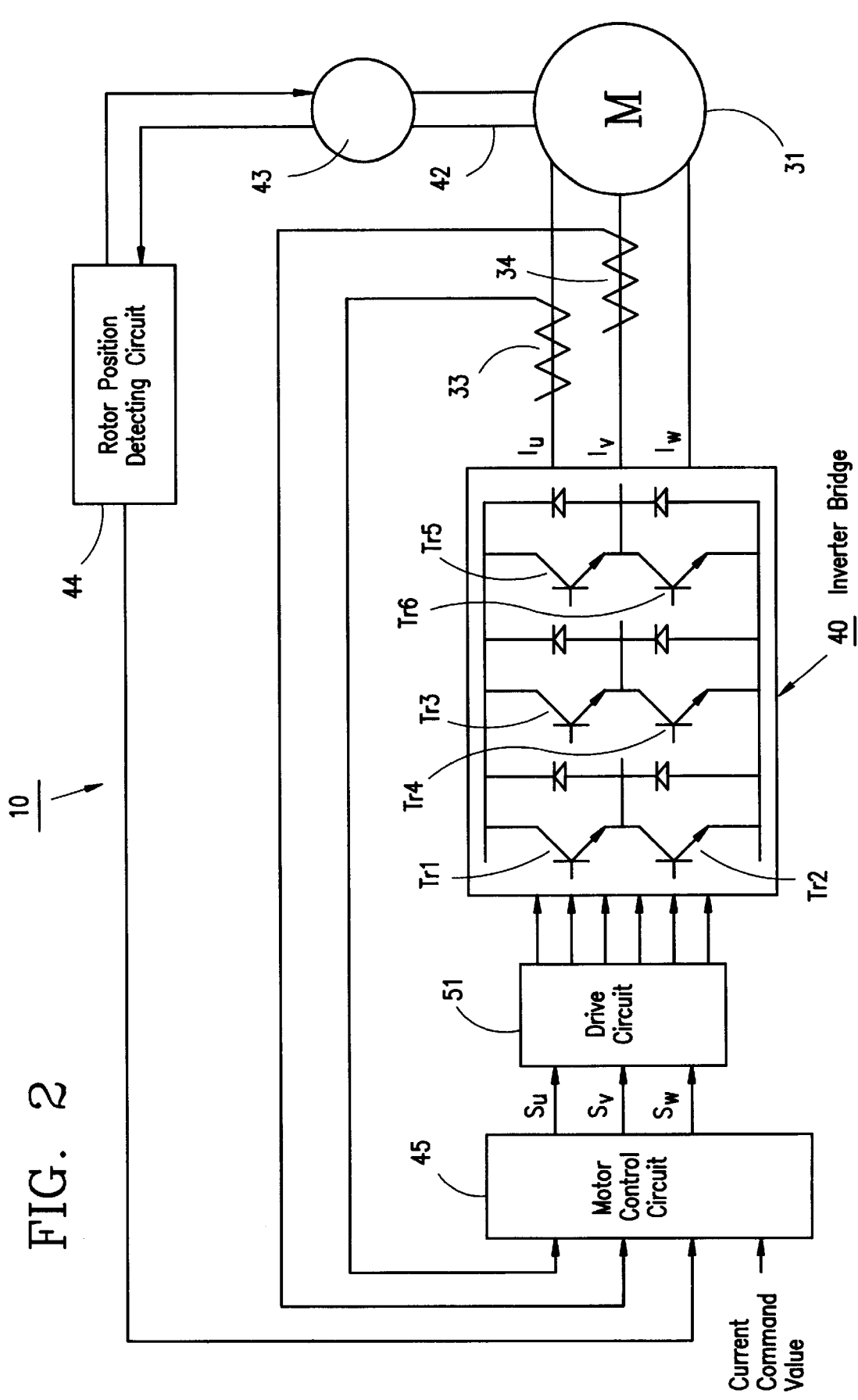
FIG. 2 is a schematic diagram of a motor drive unit in the one embodiment of the invention.

An embodiment of the invention will be described in detail with reference to the accompanying drawings wherein, in FIG. 2, reference numeral 10 designates a motor drive unit and numeral 31 designates a motor (M). This motor 31 is, for example, a brushless motor having a stator (not shown) with stator coils of U, V and W phases and a rotor (not shown) rotatably arranged in the stator and having a plurality of permanent magnets. In order to drive the motor 31 to run an electric vehicle, a DC current from a battery (not shown) or other source is converted by an inverter bridge 40 into electric currents $I_U, I_V$ and $I_W$ of U, V and W phases, which are individually fed to the corresponding stator coils of the motor.

The inverter bridge 40 includes six transistors Tr1, Tr2, Tr3, Tr4, Tr5 and Tr6 for generating the corresponding currents $I_U$, $I_V$ and $I_W$ of the individual phases by the transistors Tr1 to Tr6 being turned ON and OFF selectively. The values of currents in at least two of the motor stator phases, such as $I_U$ and $I_V$, are sensed by current sensors 33 and 34 and fed to a motor control circuit 45.

A rotor shaft 42 connected to the rotor of the motor 31 is connected to a resolver 43 which in turn is connected to a magnetic pole position detecting circuit 44. The rotor position detecting circuit 44 applies an AC voltage to the resolver 43 and detects the positions of the magnetic poles of the rotor in response to a resolver signal from the resolver 43 to output a magnetic pole position signal to the motor control circuit 45.

When a vehicle control circuit for controlling the electric vehicle as a whole generates current command values and sends these values to the motor control circuit 45, the motor control circuit 45 computes pulse widths for the motor stator phases corresponding to the current command values and generates and outputs three-phase pulse width modulation signals $S_U$, $S_V$ and $S_W$ to a drive circuit 51. In response to these pulse width modulation signals $S_U$, $S_V$ and $S_W$, the drive circuit 51 generates and outputs transistor drive signals for driving the six transistors Tr1 to Tr6 in the inverter bridge 40.

As a result, the stator coils are fed with the currents $I_U$, $I_V$ and $I_W$ of the individual phases so that a torque is generated in the rotor. Thus, the electric vehicle can be run by activating the motor drive unit 10 to drive the motor 31.

When the values of the currents of two of the individual phases are determined, the value of the current of the remaining one phase is determined. In order to control the currents $I_U$, $I_V$ and $I_W$ of the individual phases, therefore, the currents $I_U$ and $I_V$ of the U and V phases, for example, are detected by current sensors 33 and 34. Additionally, a feedback control is performed on a d-q axis model, in which a d-axis is taken in a direction of one magnetic pole pair of the rotor whereas a q-axis is taken in a direction perpendicular to the d-axis.

Figure 1:
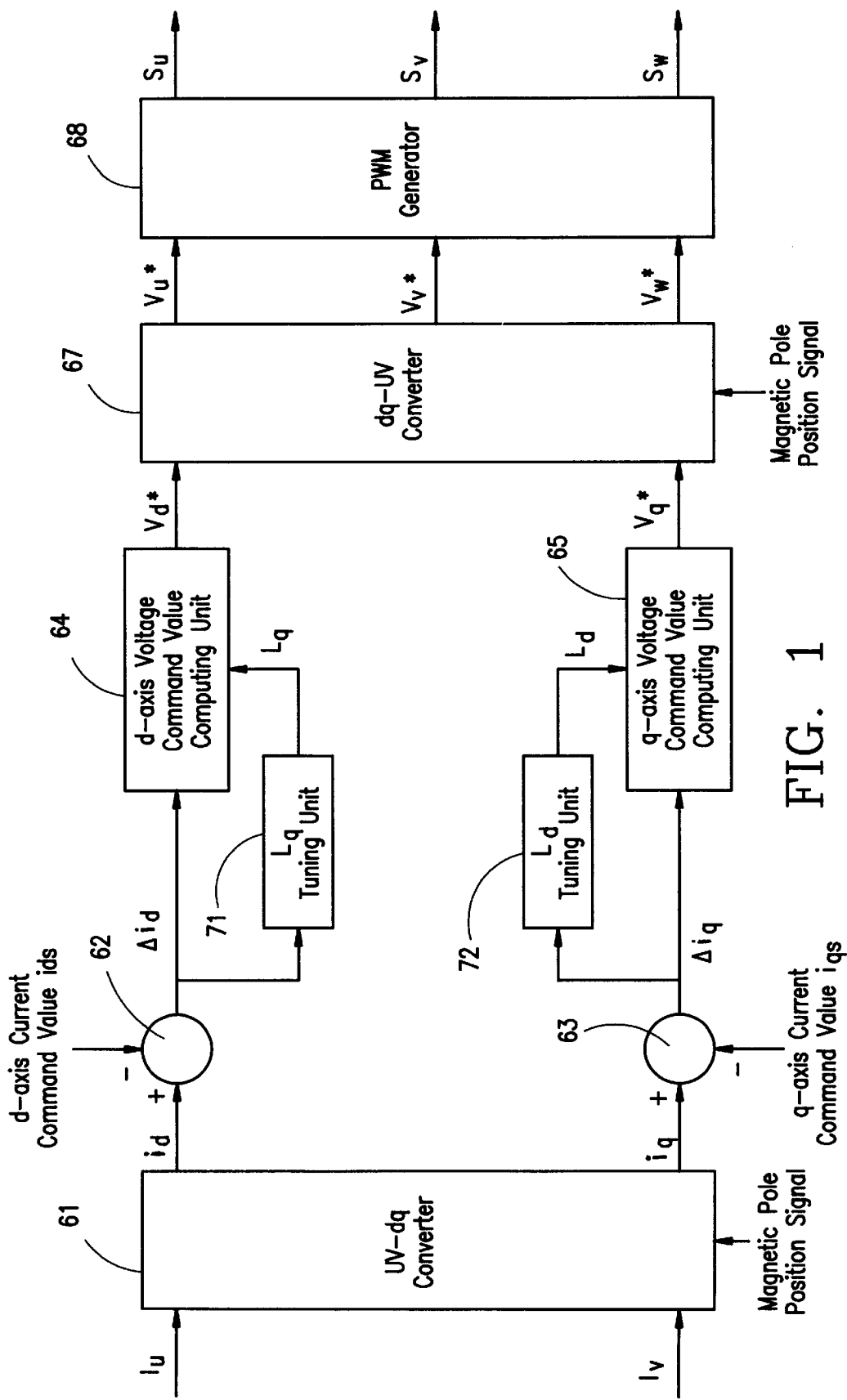
FIG. 1 is a schematic diagram of a motor control circuit in accordance with one embodiment of the invention.

The motor control circuit 45 reads in the currents $I_U$ and $I_V$ of the U and V phases, as detected by the current sensors 33 and 34, and the position of the magnetic pole of the rotor, as detected by the rotor position detecting circuit 44, and applies these readings to a UV-dq converter 61, FIG. 1, acting as first converter. This UV-dq converter 61 subjects the currents $I_U$ and $I_V$ of the U and V phases, as detected by the current sensors 33 and 34, to a three-phase to two-phase conversion, as expressed by Equation (1), on the basis of the aforementioned magnetic pole position signal, to convert them into a d-axis current value $i_d$ and a q-axis current value $i_q$ as follows:

$$\begin{bmatrix} i_d \\ i_q \end{bmatrix} = \sqrt{2} \begin{bmatrix} \sin\left(\theta - \frac{2}{3}\pi\right) & -\sin\theta \\ \cos\left(\theta - \frac{2}{3}\pi\right) & -\cos\theta \end{bmatrix} \begin{bmatrix} I_U \\ I_V \end{bmatrix} \quad (1)$$

wherein Greek letter θ designates the position of a magnetic pole of the rotor, as expressed by the aforementioned magnetic pole position signal.

The d-axis current $I_d$ is fed to a subtractor 62 which computes a d-axis current deviation $\Delta i_d$ of the d-axis current $i_d$ from the d-axis current command value $i_{ds}$ of the aforementioned current command values. The d-axis current deviation $\Delta i_d$ is output to a d-axis voltage command value computing unit 64 acting as voltage command value computing means and a $L_q$ tuning unit 71 acting as inductance tuning means. Similarly, the q-axis current $I_q$ is fed to a subtractor 63 which computes a q-axis current deviation $\Delta i_q$ of the q-axis current $i_q$ from the q-axis current command value $i_{qs}$ of the aforementioned current command values. The q-axis current deviation $\Delta i_q$ is output to a q-axis voltage command value computing unit 65 acting as the voltage command value computing means and an $L_d$ tuning unit 72 acting as the inductance tuning means.

The d-axis voltage command value computing unit 64 and the q-axis voltage command value computing unit 65 compute the RPM ω of the motor 31 and generate and output a d-axis voltage command value $V_d^*$ and a q-axis voltage command value $V_q^*$, as expressed by Equations (2) and (3), to a dq-UV converter 67 acting as second conversion means.

$$V_d^* = K_p \cdot \Delta i_d + K_I \cdot \Sigma \Delta i_d - \omega \cdot L_q \cdot i_q \quad (2)$$

$$V_q^* = K_p \cdot \Delta i_q + K_I \cdot \Sigma \Delta i_q + \omega \cdot MIf + \omega \cdot L_d \cdot i_d \quad (3)$$

In equations (2) and (3), $K_p$ and $K_I$ are identification gains, MIf is the number of interlinking magnetic fluxes on the rotor side, $L_d$ is the d-axis inductance of the motor 31, and $L_q$ is the q-axis inductance of the motor 31.

The d-axis inductance $L_d$ and the q-axis inductance $L_q$ are employed as parameters so as to prevent the interference between the d-axis voltage command value $V_d^*$ and the q-axis voltage command value $V_q^*$, i.e., to compensate for cross inductances.

Subsequently, the dq-UV converter 67 performs the two-phase to three-phase conversion on the basis of the rotor magnetic pole position signal to convert the d-axis voltage command value $V_d^*$ and the q-axis voltage command value $V_q^*$ into voltage command values $V_U^*$, $V_V^*$ and $V_W^*$ of the individual phases, as expressed by Equation (4), and output the voltage command values $V_U^*$, $V_V^*$ and $V_W^*$ of the individual phases to a PWM generator 68 acting as pulse width modulation signal generating means.

$$\begin{bmatrix} V_{U^*} \\ V_{V^*} \end{bmatrix} = \sqrt{\frac{2}{3}} \begin{bmatrix} -\cos\theta\sin\theta \\ -\cos\left(\theta - \frac{2}{3}\pi\right)\sin\left(\theta - \frac{2}{3}\pi\right) \end{bmatrix} \begin{bmatrix} V_{d^*} \\ V_{q^*} \end{bmatrix} \quad (4)$$

This PWM generator 68 generates the pulse width modulation signals $S_U$, $S_V$ and $S_W$ of the individual phases on the basis of the voltage command values $V_U^*$, $V_V^*$ and $V_W^*$ of the individual phases.

The voltage command value $V_W^*$ is automatically determined when the voltage command values $V_U^*$ and $V_V^*$ are determined. When the d-axis voltage command value $V_d^*$ and the q-axis voltage command value $V_q^*$ are individually generated, they are prevented from interfering by using the d-axis inductance $L_d$ and the q-axis inductance $L_q$, as expressed by Equations (2) and (3).

In the motor control circuit 45 of the prior art, the d-axis inductance $L_d$ and the q-axis inductance $L_q$ of the motor 31 are estimated by using the transient changes in the d-axis current $i_d$ and the q-axis current $i_q$. Since the prior art computations of the d-axis inductance $L_d$ and the q-axis inductance $L_q$ of the actual motor 31 are difficult to compute in the motor control circuit 45, the scale of this motor control circuit 45, in the prior art, is enlarged to increase the cost. Also the current $I_U$, $I_V$ and $I_W$ of the individual phases are liable to become unstable in the steady state, so the prior art time constants for the identifications have to be enlarged resulting in lowering the response time. Additionally errors between the d-axis inductance $L_d$ of the actual motor 31 and the d-axis inductance $L_d$ estimated by the motor control circuit 45 and between the q-axis inductance $L_q$ of the actual motor 31 and the q-axis inductance $L_q$ estimated by the motor control circuit 45 are produced by steady deviations in the d-axis current $i_d$ and the q-axis current $i_q$ so that the currents $I_U$, $I_V$ and $I_W$ of the individual phases cannot be accurately controlled.

The d-axis inductance and the q-axis inductance of the actual motor 31 can be designated by $L_D$ and $L_Q$, respectively. The errors between the d-axis inductance $L_D$ of the actual motor 31 and the d-axis inductance $L_d$ estimated by the motor control circuit 45 and between the q-axis inductance $L_Q$ of the actual motor 31 and the q-axis inductance $L_q$ estimated by the motor control circuit 45 can be overcome by tuning or adjusting inductance values. The d-axis inductance $L_d$ and the q-axis inductance $L_q$ are tuned in this embodiment in accordance with the d-axis current deviation $\Delta i_d$ and the q-axis current deviation $\Delta i_q$ corresponding to the errors. The tuned d-axis inductance $L_d$ and q-axis inductance $L_q$ are fed to the d-axis voltage command value computing unit 64 and the q-axis voltage command value computing unit 65, respectively.

Here will be described a method of tuning the d-axis inductance $L_d$ and the q-axis inductance $L_q$ in the $L_q$ tuning unit 71 and the $L_d$ tuning unit 72.

Specifically, the d-axis voltage command value $V_d^*$ and the q-axis voltage command value $V_q^*$ can be intrinsically expressed by Equation (5):

$$\begin{bmatrix} V_{d^*} \\ V_{q^*} \end{bmatrix} = \begin{bmatrix} K_P \cdot \Delta i_d + K_I \cdot \sum \Delta i_d - \omega \cdot L_Q \cdot i_q \\ K_P \cdot \Delta i_q + K_I \cdot \sum \Delta i_q + \omega \cdot MIf + \omega \cdot L_D \cdot i_d \end{bmatrix} \quad (5)$$

If the errors between the d-axis inductance $L_D$ of the actual motor 31 and the d-axis inductance $L_d$ estimated by the motor control circuit 45 and between the q-axis inductance $L_Q$ of the actual motor 31 and the q-axis inductance $L_q$ estimated by the motor control circuit 45 are designated by $\Delta L_d$ and $\Delta L_q$ respectively, the d-axis inductance $L_D$ and the q-axis inductance $L_Q$ are expressed by:

$$L_D = L_d + \Delta L_d;$$

and $$L_Q = L_q + \Delta L_q.$$

With the aforementioned errors $\Delta L_d$ and $\Delta L_q$, therefore, the d-axis voltage command value $V_d^*$ and the q-axis voltage command value $V_q^*$ are expressed in the steady state by Equation (6):

$$\begin{bmatrix} V_{d^*} \\ V_{q^*} \end{bmatrix} = \begin{bmatrix} -\omega(L_q + \Delta L_q)i_q \\ \omega \cdot MIf + \omega(L_d + \Delta L_d)i_d \end{bmatrix} \quad (6)$$

When the d-axis voltage command value $V_d^*$ and the q-axis voltage command value $V_q^*$, as expressed by Equation (6), are generated in the d-axis voltage command value computing unit 64 and the q-axis voltage command value computing unit 65, respectively, steady deviations $\Delta i_D$ and $\Delta i_Q$, as expressed by Equation (7), occur.

$$\begin{bmatrix} \Delta i_D \\ \Delta i_Q \end{bmatrix} = \begin{bmatrix} \dfrac{v_{d^*} + \omega \cdot L_q \cdot i_q}{L_d} \\ \dfrac{V_{q^*} - \omega \cdot MIf - \omega \cdot L_d \cdot i_d}{L_q} \end{bmatrix} \quad (7)$$

$$\begin{bmatrix} \Delta i_D \\ \Delta i_Q \end{bmatrix} = \begin{bmatrix} \dfrac{-\omega(L_q + \Delta L_q)i_q + \omega \cdot L_q \cdot i_q}{L_d} \\ \dfrac{\omega \cdot MIf + \omega(L_d + \Delta L_d)i_d - \omega \cdot MIf - \omega \cdot L_d \cdot i_d}{L_q} \end{bmatrix}$$

$$\begin{bmatrix} \Delta i_D \\ \Delta i_Q \end{bmatrix} = \begin{bmatrix} \dfrac{-\omega \cdot \Delta L_q \cdot i_q}{L_d} \\ \dfrac{\omega \cdot \Delta L_d \cdot i_d}{L_q} \end{bmatrix}$$

By reforming Equation (7) using the steady deviations $\Delta i_D$ and $\Delta i_Q$ as the d-axis current deviation $\Delta i_d$ and the q-axis current deviation $\Delta i_q$, therefore, Equation (8) is obtained.

$$\begin{bmatrix} \Delta L_d \\ \Delta L_q \end{bmatrix} = \begin{bmatrix} \dfrac{\Delta i_q \cdot L_q}{\omega \cdot i_q} \\ \dfrac{\Delta i_d \cdot L_d}{\omega \cdot i_d} \end{bmatrix} \quad (8)$$

If the d-axis inductance $L_d$ and the q-axis inductance $L_q$ are tuned to set the d-axis current deviation $\Delta i_d$ and the q-axis current deviation $\Delta i_q$ to zero (0), the respective errors $\Delta L_d$ and $\Delta L_q$ of the d-axis inductance $L_d$ and the q-axis inductance $L_q$ can be reduced to zero (0).

In the $L_q$ tuning unit 71 and the $L_d$ tuning unit 72, therefore, the following logics are made.

$\omega > 0$, $i_d < 0$ and $i_q > 0$:
for $\Delta i_d > 0$, the q-axis inductance $L_q$ is decreased;
for $\Delta i_d < 0$, the q-axis inductance $L_q$ is increased;
for $\Delta i_q > 0$, the d-axis inductance $L_d$ is decreased;
for $\Delta i_q < 0$, the d-axis inductance $L_d$ is increased;
$\omega > 0$, $i_d < 0$ and $i_q < 0$:
for $\Delta i_d > 0$, the q-axis inductance $L_q$ is increased;
for $\Delta i_d < 0$, the q-axis inductance $L_q$ is decreased;
for $\Delta i_q > 0$, the d-axis inductance $L_d$ is decreased
for $\Delta i_q < 0$, the d-axis inductance $L_d$ is increased;
$\omega < 0$, $i_d < 0$ and $i_q < 0$:
for $\Delta i_d > 0$, the q-axis inductance $L_q$ is decreased;
for $\Delta i_d < 0$, the q-axis inductance $L_q$ is increased;
for $\Delta i_q > 0$, the d-axis inductance $L_d$ is increased;
for $\Delta i_q < 0$, the d-axis inductance $L_d$ is decreased.

For this, computations, as expressed in Equations (9) and (10), are performed in the $L_q$ tuning unit 71 and the $L_d$ tuning unit 72, respectively:

$$L_q(n+1) = L_q(n) - K \cdot \Delta i_d(n) \cdot \text{sgn}[\omega(n)] \cdot \text{sgn}[i_q(n)] \quad (9)$$

$$L_d(n+1)=L_d(n)-K\cdot\Delta i_q(n)\cdot\text{sgn}[\omega(n)]\cdot\text{sgn}[i_d(n)] \quad (10)$$

wherein K is an identification gain, and sgn[x] is the sign (+ or −) of x.

Even with the errors $\Delta L_d$ and $\Delta L_q$ between the d-axis inductance $L_D$ of the actual motor 31 and the d-axis inductance $L_d$ estimated by the motor control circuit 45 and between the q-axis inductance $L_Q$ of the actual motor 31 and the q-axis inductance $L_q$ estimated by the motor control circuit 45 and even with the steady deviations $\Delta i_D$ and $\Delta i_Q$ in the d-axis current $i_d$ and the q-axis current $i_q$, the d-axis inductance $L_d$ and the q-axis inductance $L_q$ are tuned by the inductance tuning units 64 and 65 so that the d-axis current deviation $\Delta i_d$ and the q-axis current deviation $\Delta i_q$ can be reduced to zero (0). Thus, it is possible to control the currents $I_U$, $I_V$ and $I_W$ of the individual phases accurately.

Since the d-axis inductance $L_D$ and the q-axis inductance $L_Q$ of the actual motor 31 need not be identified by computations, it is possible to simplify the computations and to lower the cost for the motor control system. Also the currents $I_U$, $I_V$ and $I_W$ of the individual phases are stabilized in the steady state. Furthermore, the time constants for identifications can be reduced to provide a much quicker response.

The errors $\Delta L_d$ and $\Delta L_q$ cannot be reduced if the RPM $\omega$, the d-axis current $i_d$ or the q-axis current $i_q$ is zero (0) in the aforementioned Equation (8). Therefore, the d-axis voltage command value computing unit 64 and the q-axis voltage command value computing unit 65 interrupt the identifications or tuning of the d-axis inductance $L_d$ and the q-axis inductance $L_q$, when the RPM $\omega$, the d-axis current $i_d$ or the q-axis current $i_q$ becomes lower than a set value. Preset values for extremely low speeds are read out as the d-axis inductance $L_d$ and the q-axis inductance $L_q$ such as could be stored in a map. Under these low conditions of speed, d-axis current or q-axis current, the errors $\Delta L_d$ and $\Delta L_q$ exert, if any, sufficiently low influences so as to avoid the problems of the prior art.

Figure 3:
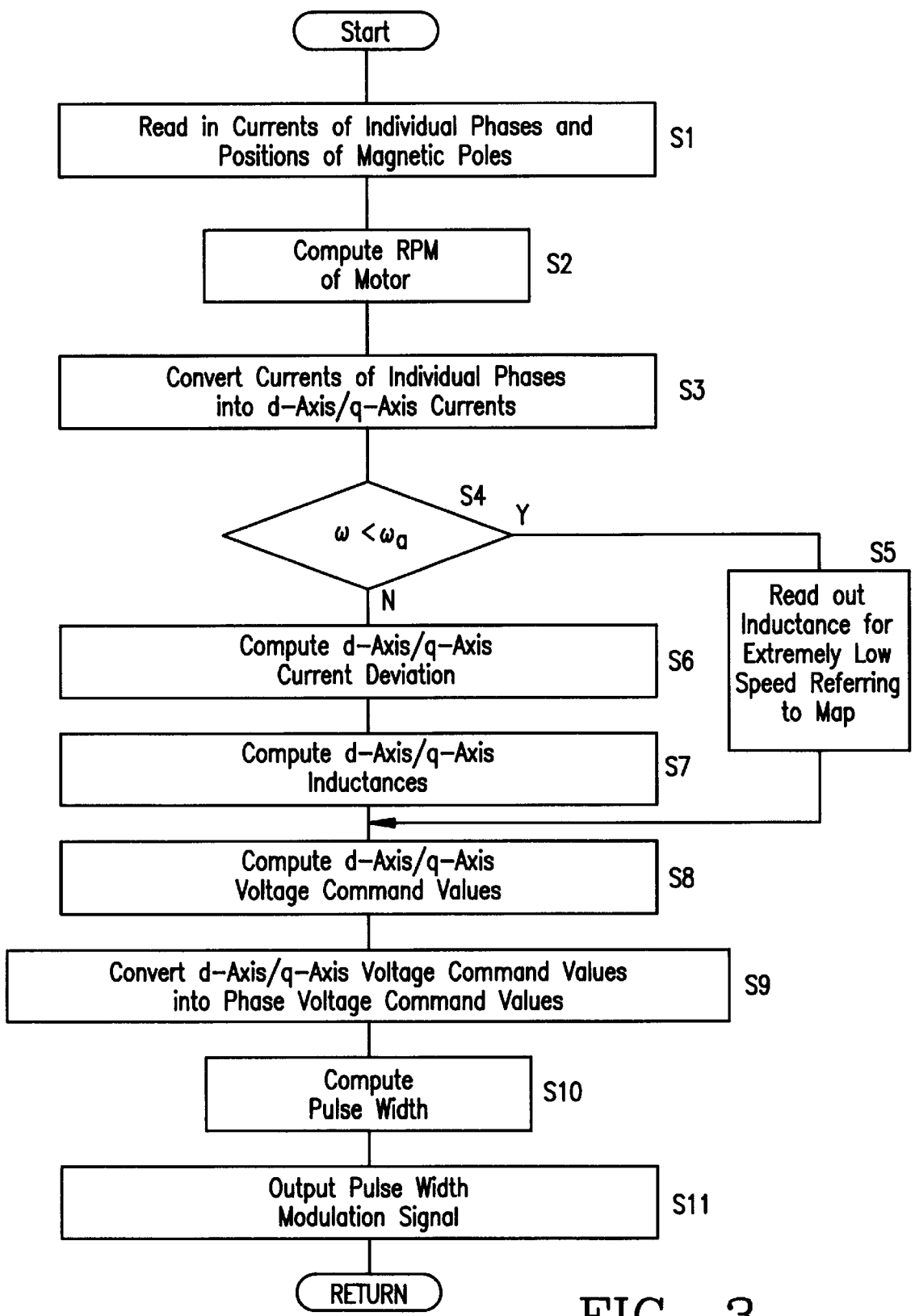
FIG. 3 is a flow chart showing the actions of the motor control circuit in the one embodiment of the invention.

Here will be described the flow chart of FIG. 3.

Step S1: The currents $I_U$ and $I_V$ of the individual phases and the positions of the magnetic poles of the rotor are read in.

Step S2: The RPM $\omega$ of the motor 31 is computed.

Step S3: The currents $I_U$ and $I_V$ of the individual phases are converted into the d-axis current $i_d$ and the q-axis current $i_q$.

Step S4: It is decided whether or not the RPM $\omega$ is smaller than a set value $\omega_a$. The routine advances to Step S5, if the RPM $\omega$ is smaller than the set value $\omega_a$, and to Step S6 if the RPM $\omega$ is equal to or larger than the set value $\omega_a$.

Step S5: The d-axis inductance $L_d$ and the q-axis inductance $L_q$ for the extremely low speed are read out from a map or table.

Step S6: The d-axis current deviation $\Delta i_d$ and the q-axis current deviation $\Delta i_q$ are computed.

Step S7: The d-axis inductance $L_d$ and the q-axis inductance $L_q$ are computed.

Step S8: The d-axis voltage command value Vd* and the q-axis voltage command value Vq* are computed.

Step S9: The d-axis voltage command value Vd* and the q-axis voltage command value Vq* are converted into the voltage command values $V_U^*$, $V_V^*$ and $V_W^*$ of the individual phases.

Step S10: The pulse width is computed.

Step S11: The pulse width modulation signals $S_U$, $S_V$ and $S_W$ are output.

The entire disclosure of Japanese Patent Application No. 9-181483 filed on Jul. 7, 1998, including specification, claims and drawings, is incorporated herein by reference.

While the invention has been described with reference to a preferred embodiment, the foregoing embodiment is merely illustrative of the invention and is not to be construed as limiting the invention. Various modifications and applications may be adopted by those skilled in the art without departing from the true spirit and scope of the invention as defined by the appended claims.

What is claimed is:

1. A motor control system comprising:

current sensors for detecting values of currents in individual stator phases of a motor;

a magnetic pole detector for detecting a position of a rotor magnetic pole of the motor;

a first converter for converting the detected values of currents of the individual stator phases into a d-axis current value and a q-axis current value based on the detected position of the rotor magnetic pole;

voltage command value computing means for computing a d-axis voltage command value and a q-axis voltage command value on the basis of corresponding deviations of the d-axis and q-axis current values from respective d-axis and q-axis command current values and on the basis of q-axis and d-axis inductance values;

inductance tuning means for tuning the respective q-axis and d-axis inductance values so that the d-axis current deviation and the q-axis current deviation is reduced to zero;

a second converter for converting the d-axis and the q-axis voltage command values into voltage command values of individual stator phases in accordance with the position of the rotor magnetic pole; and a pulse width modulator for generating pulse width modulating signals of the individual stator phases on the basis of the voltage command values of the individual stator phases.

2. A motor control system according to claim 1 wherein said inductance tuning means interrupts tuning of the d-axis inductance and the q-axis inductance on the basis of the d-axis current deviation and the q-axis current deviation, when at least one of the RPM, the d-axis current and the q-axis current becomes lower than a respective set value, and tunes the d-axis inductance and the q-axis inductance on the basis of preset values for an extremely low speed.

3. A motor control system as claimed in claim 1 said inductance tuning means tunes the d-axis inductance value $L_d$ and the q-axis inductance value $L_q$ on the basis of RPM $\omega$, d-axis current $i_d$, q-axis current $i_q$, d-axis current deviation $\Delta i_d$ and q-axis current deviation $\Delta i_q$ when $\omega>0$, $i_d<0$ and $i_q>0$:

for $\Delta i_d>0$, the q-axis inductance $L_q$ is decreased;
for $\Delta i_d<0$, the q-axis inductance $L_q$ is increased;
for $\Delta i_q>0$, the d-axis inductance $L_d$ is decreased;
for $\Delta i_q<0$, the d-axis inductance $L_d$ is increased;

when $\omega>0$, $i_d<0$ and $i_q<0$:

for $\Delta i_d>0$, the q-axis inductance $L_q$ is increased;
for $\Delta i_d<0$, the q-axis inductance $L_q$ is decreased;
for $\Delta i_q>0$, the d-axis inductance $L_d$ is decreased
for $\Delta i_q<0$, the d-axis inductance $L_d$ is increased;

and when $\omega<0$, $i_d<0$ and $i_q<0$:

for $\Delta i_d>0$, the q-axis inductance $L_q$ is decreased;
for $\Delta i_d<0$, the q-axis inductance $L_q$ is increased;
for $\Delta i_q>0$, the d-axis inductance $L_d$ is increased;
for $\Delta i_q<0$, the d-axis inductance $L_d$ is decreased.

4. A motor control system as claimed in claim 1 wherein said inductance tuning means tunes the d-axis inductance value $L_d$ and the q-axis inductance value $L_q$ on the basis of RPM $\omega$, d-axis current $i_d$, q-axis current $i_q$, d-axis current deviation $\Delta i_d$, q-axis current deviation $\Delta i_q$ and identification gain K according to the following equations:

$$L_q(n+1)=L_q(n)-K\cdot\Delta i_d(n)\cdot\text{sign}[\omega(n)]\cdot\text{sign}[i_q(n)]$$

$$L_d(n+1)=L_d(n)+K\cdot\Delta i_q(n)\cdot\text{sign}[\omega(n)]\cdot\text{sign}[i_d(n)].$$

5. A motor control method comprising:

detecting current values of individual stator phases;

detecting the position of a rotor magnetic pole;

converting the current values of the individual stator phases into a d-axis current value and a q-axis current value on the basis of the position of the rotor magnetic pole;

computing a d-axis voltage command value and a q-axis voltage command value on the basis of corresponding deviations of the d-axis and q-axis current values from respective d-axis and q-axis command current values and on the basis of q-axis and d-axis inductance values;

tuning the q-axis and d-axis inductance values so that the d-axis and q-axis current deviations approach zero;

converting the d-axis and q-axis voltage command values into voltage command values of the individual stator phases on the basis of the position of the rotor magnetic pole; and generating pulse width modulation signals of the individual stator phases on the basis of the voltage command values of the individual stator phases.

6. A motor control method according to claim 5 wherein inductance tuning interrupts tuning of the d-axis inductance and the q-axis inductance on the basis of the d-axis and q-axis deviations, when at least one of the RPM, the d-axis current and the q-axis current becomes lower that a set value, and tunes the d-axis inductance and the q-axis inductance on the basis of preset values for an extremely low speed.

7. A motor control method as claimed in claim 5 said inductance tuning tunes the d-axis inductance value $L_d$ and the q-axis inductance value $L_q$ on the basis of RPM $\omega$, d-axis current $i_d$, q-axis current $i_q$, d-axis current deviation $\Delta i_d$ and q-axis current deviation $\Delta i_q$ when $\omega>0$, $i_d<0$ and $i_q>0$:

for $\Delta i_d>0$, the q-axis inductance $L_q$ is decreased;

for $\Delta i_d<0$, the q-axis inductance $L_q$ is increased;

for $\Delta i_q>0$, the d-axis inductance $L_d$ is decreased;

for $\Delta i_q<0$, the d-axis inductance $L_d$ is increased;

when $\omega>0$, $i_d<0$ and $i_q<0$:

for $\Delta i_d>0$, the q-axis inductance $L_q$ is increased;

for $\Delta i_d<0$, the q-axis inductance $L_q$ is decreased;

for $\Delta i_q>0$, the d-axis inductance $L_d$ is decreased for $\Delta i_q<0$, the d-axis inductance $L_d$ is increased;

and when $\omega<0$, $i_d<0$ and $i_q<0$:

for $\Delta i_d>0$, the q-axis inductance $L_q$ is decreased;

for $\Delta i_d<0$, the q-axis inductance $L_q$ is increased;

for $\Delta i_q>0$, the d-axis inductance $L_d$ is increased;

for $\Delta i_q<0$, the d-axis inductance $L_d$ is decreased.

8. A motor control system as claimed in claim 5 wherein said inductance tuning tunes the d-axis inductance value $L_d$ and the q-axis inductance value $L_q$ on the basis of RPM $\omega$, d-axis current $i_d$, q-axis current $i_q$, d-axis current deviation $\Delta i_d$, q-axis current deviation $\Delta i_q$ and identification gain K according to the following equations:

$$L_q(n+1)=L_q(n)-K\cdot\Delta i_d(n)\cdot\text{sign}[\omega(n)]\cdot\text{sign}[i_q(n)]$$

$$L_d(n+1)=L_d(n)+K\cdot\Delta i_q(n)\cdot\text{sign}[\omega(n)]\cdot\text{sign}[i_d(n)].$$

* * * * *